UNITED STATES PATENT OFFICE.

J. P. THOMPSON, OF KIRKVILLE, IOWA.

IMPROVED COMPOSITION FOR ROOFING.

Specification forming part of Letters Patent No. 59,682, dated November 13, 1866.

*To all whom it may concern:*

Be it known that I, J. P. THOMPSON, of Kirkville, in the county of Wapello and State of Iowa, have invented a new and useful Improvement in Composition Roofing for Houses; and I do hereby declare that the following is a full, clear, and exact description of the same.

The object of this invention is to form a covering for roofs, &c., which, while impervious to water, is, when applied, soft, and, toughening with time, gradually hardens into a fire-proof cement, resembling stone, so that when the building is new and liable to shrink, the composition will not crack, and afterward it becomes very hard. This I accomplish by the following process:

Take common coal-tar, raw, and mingle therewith pulverized limestone in the following proportions: To one gallon of raw coal-tar add fifty pounds of pulverized limestone; mix well together, and apply with a trowel to filling-paper, shingles, boards, or whatever material may be used; spread in a thin sheet.

The proportions here stated are approximate only, and may be varied according to circumstances, and I do not limit my claim to these precise proportions; but

What I claim as my invention, and desire to secure by Letters Patent, is—

A composition for roofing compounded from the ingredients named, and substantially as set forth.

In testimony whereof I have signed my name to this specification in the presence of two subscribing witnesses.

J. P. THOMPSON.

Witnesses:
JAMES TORRENCE,
DAVID McCULLOUGH.